Nov. 18, 1969  G. L. SELMAN  3,478,415
BONDING OF METALS OR ALLOYS
Filed Aug. 12, 1966
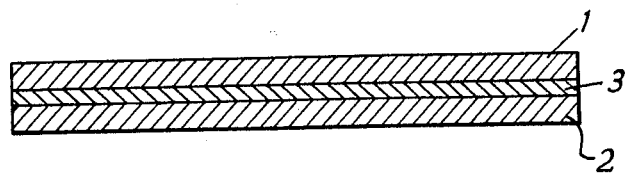

United States Patent Office 3,478,415
Patented Nov. 18, 1969

3,478,415
BONDING OF METALS OR ALLOYS
Gordon L. Selman, London, England, assignor to Johnson Matthey & Company Limited, London, England, a British company
Filed Aug. 12, 1966, Ser. No. 572,031
Claims priority, application Great Britain, Aug. 27, 1965, 36,907/65
Int. Cl. B23k 31/02
U.S. Cl. 29—497.5        7 Claims

ABSTRACT OF THE DISCLOSURE

A method of bonding, and the resulting assembly, wherein two dissimilar metals are bonded together by the use of an intermediate barrier layer which is disposed between the two dissimilar metals, the barrier layer being formed of a mixture of a refractory ceramic material and a metal which is substantially insoluble in one of the metals to be bonded but is substantially soluble in the other metal to be bonded.

---

This invention relates to improvements in and relating to the bonding together of dissimilar metals, or to the cladding of a base of one metal with a layer of another metal. More particularly, but by no means exclusively, the invention is concerned with the cladding of refractory base metals with a platinum group metal (including an alloy) or other noble metal (including an alloy). In this specification the word metal is to be construed broadly to include also an alloy.

Platinum group metal-clad refractory metals find extensive use in the glass and chemical industries where strength, coupled with resistance to corrosion, is an important requirement for the apparatus used. Platinum-clad molybdenum or nickel, or platinum-clad stainless steel, are typical examples of bonded metals which may be used for the production, for example, of stirrers, dies, immersion heaters for the glass industry or reaction vessels and pipe-lines for the chemical industry.

Platinum-clad or bonded refractory metals as heretofore produced for these and other purposes have, however, unfortunately not proved entirely satisfactory, particularly in the glass industry, owing to the rapid interdiffusion and alloying of the constituent metals which occurs at elevated temperatures.

In order to overcome this difficulty, it has been suggested to introduce an intermediate layer of a third metal as a barrier layer between the refractory metal base and the platinum layer which would substantially prevent this interdiffusion. Various materials have been proposed for this purpose, including layers of other platinum group metals, iron, nickel, rhenium, aluminium and gold. Metallic compounds such as silicides, borides or nitrides have also been suggested, but, up to the present, little or no success has been achieved in solving the outstanding problem.

The use of a ceramic bonding layer, such as a layer of alumina, has also been suggested, but this again has not proved entirely successful owing to the fact that it is not possible to obtain an efficient bond between the metal parts.

As will be appreciated, a truly effective barrier layer would be one which is completely inert to both the refractory metal base and to the cladding metal, is sufficiently ductile to resist impact fracture and, at the same time, it must form a good bond with both the metallic layers whilst allowing for possible differential thermal expansion. It is not surprising, therefore, that a satisfactory material for this purpose has not yet been found.

The applicants have investigated the problem and have now surprisingly found that the problem is possible of solution and in a relatively simple manner.

An object of this invention, therefore, is to overcome the disadvantages hitherto associated with the bonding together or cladding of dissimilar metals with the use of an intermediate barrier layer.

Another object is to provide an improved method of bonding together a refractory metal base and a dissimilar cladding metal.

A limited object of the invention is to provide an improved method of bonding a layer of a platinum group metal to a refractory metal base.

According to one feature of this invention, therefore, there is provided a method of bonding together two dissimilar metals or alloys by the use of an intermediate barrier layer, located between said metals or alloys, wherein the barrier layer is formed of a mixture of a refractory ceramic material and a metal, which latter is substantially insoluble in one of the metals to be bonded, but substantially soluble in the other metal.

The invention also includes a bonded assembly of two dissimilar metals for example a platinum clad molybdenum assembly characterised by the provision of an intermediate barrier layer formed of a mixture of a refractory ceramic material and a metal which is substantially insoluble in one of the metals to be bonded but is substantially soluble in the other metal to be bonded.

In carrying out the invention in practice, one of the metals is advantageously a refractory metal, such as, for example, molybdenum, tungsten, niobium, tantalum or titanium, or a stainless steel or a nickel-chromium alloy and the cladding metal is preferably a platinum group metal, advantageously platinum. The ceramic constituent of the mixture may be alumina, zirconia, thoria, beryllia, hafnia, silica or titania.

According to a more limited feature of the invention, there is provided a method of bonding together a refractory metal part and a platinum group metal part which comprises applying to one surface of one of said metal parts a barrier layer composed of a mixture of a refractory ceramic material and a metal or alloy, which latter is substantially insoluble in the refractory metal, but is soluble in the platinum group metal, applying to the said barrier layer the said other metal part and applying heat and pressure to said assembly to cause the metal constituent of said barrier layer mixture to diffuse into, and alloy with, the platinum group metal and leave a layer or barrier of refractory ceramic material between, and intimately bonded to, said refractory metal and platinum group metal parts.

The invention will be found to be particularly suitable for use in the production of platinum- or rhodium-platinum-clad-molybdenum, -tungsten or -niobium for high temperature applications in the glass industry, or of platinum- or rhodium-platinum-clad-nickel-chromium alloys or -thoriated nickel for medium temperature use in the glass or chemical industries.

The metallic constituent of the barrier layer will depend on the nature of the metals to be bonded. For example, in the case of the bonding of molybdenum and platinum, the most satisfactory metal will be found to be gold. Gold is insoluble in solid molybdenum and takes into solid solution only about ½% of molybdenum at 1000° C. It also dissolves readily in platinum, the resultant gold-platinum solid solution being oxidation and creep resistant. The ceramic constituent of the barrier layer is preferably alumina, from which gold/alumina mixtures of considerable ductility can be produced.

Similarly, a mixture of gold and alumina, zirconia or thoria may be used as a barrier layer between platinum and niobium. In the case of the bonding of gold to iron or stainless steel, the metallic constituent of the barrier layer mixture may be silver.

In general, however, it may be said that the metallic constituent of the barrier layer mixture may be any metal which is sufficiently ductile to allow working, fabrication of the bonded assembly and which will diffuse into the metal part in which it is soluble at a faster rate than the latter metal diffuses in the reverse direction. Moreover, the alloy formed as a result of this diffusion must be comparable in its resistance to high temperatures and oxidation to that of the said metal part. The metallic constituent must also be substantially insoluble in the metal of the other part of the assembly.

The refractory ceramic constituent of the mixture may be any refractory compound such, for example, as a refractory oxide, carbide, nitride, boride or silicide, which is physically and chemically compatible at high temperatures with both the metals to be bonded together.

It is to be understood that the invention is intended to include within its scope a bonded assembly of two dissimilar metals, such, for example, as a platinum-clad molybdenum assembly, which has been made by the method of the invention.

The drawing illustrates diagrammatically a bonded assembly in which 1 and 2 are the dissimilar metals and 3 is the barrier layer.

What I claim is:

1. A method of bonding together a refractory metal part and a platinum group metal part which comprises applying to one surface of one of the metal parts a barrier layer composed of a mixture of a refractory ceramic material and a metal which is substantially insoluble in the refractory metal but is substantially soluble in the platinum group metal, applying to the said barrier layer the other metal part and applying heat and pressure to the said assembly to cause the metal constituent of the said barrier layer mixture to diffuse into and alloy with the platinum group metal and to leave a layer or barrier of refractory ceramic material between and intimately bonded to the refractory metal and platinum group metal parts.

2. A method according to claim 1 wherein the two dissimilar metals are platinum or rhodium-platinum as the cladding metal and molybdenum, tungsten or niobium for high temperature use.

3. A method according to claim 1 wherein the two dissimilar metals are platinum or rhodium-platinum as the cladding metal and nickel-chromium or thoriated nickel for medium temperature use.

4. A method according to claim 1 wherein the dissimilar metals are molybdenum and platinum, the metallic constituent of the barrier layer is gold and the ceramic material is alumina.

5. A method according to claim 1 wherein the dissimilar metals are platinum and niobium, the metallic constituent of the barrier layer is gold, and the ceramic material is selected from the group consisting of alumina, zirconia, and thoria.

6. A method according to claim 1 of bonding gold to iron or stainless steel wherein the metallic constituent of the barrier layer is silver.

7. A method according to claim 1 wherein the ceramic material is a refractory compound for example a refractory oxide including a carbide, nitride, boride or silicide which is physically and chemically compatible at high temperature with both the metals to be bonded together.

References Cited
UNITED STATES PATENTS

| | | | |
|---|---|---|---|
| 2,698,913 | 1/1955 | Espersen. | |
| 2,719,797 | 10/1955 | Rosenblatt | 29—498 X |
| 3,115,702 | 12/1963 | Scutt | 29—498 X |
| 3,156,976 | 11/1964 | Whiting | 29—504 X |
| 3,182,395 | 5/1965 | Scott | 29—498 |

JOHN F. CAMPBELL, Primary Examiner

J. L. CLINE, Assistant Examiner

U.S. Cl. X.R.

29—498, 504